May 7, 1968  H. P. VAYSON  3,381,842
SEALED EVACUATED TANK
Filed Oct. 15, 1965
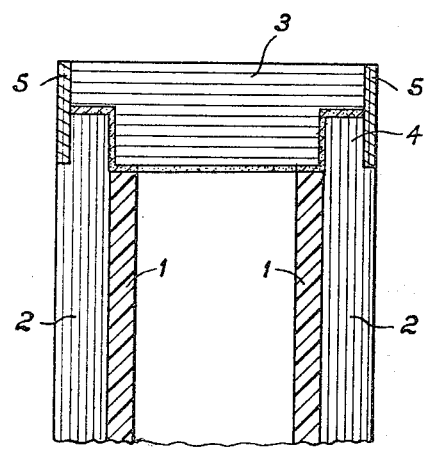
INVENTOR
HENRI PAUL VAYSON

United States Patent Office 3,381,842
Patented May 7, 1968

3,381,842
SEALED EVACUATED TANK
Henri Paul Vayson, Paris, France, assignor to Societe
Generale de Constructions Electriques et Mecaniques
(Alsthom), Belfort, France, a French body corporate
Filed Oct. 15, 1965, Ser. No. 496,273
Claims priority, application France, Oct. 15, 1964,
2,557, Patent 1,419,781
2 Claims. (Cl. 220—2.1)

ABSTRACT OF THE DISCLOSURE

This invention relates to the provision of a cylindrical evacuated sealed tank for electrical machinery operating in a cryogenic medium. The tank of the invention comprises inner and outer cylinders, the inner one being made from glass or a thermoplastics material and the outer cylinder being formed by applying around the first cylinder a glass cloth impregnated with a thermosetting resin. The second cylinder has axial extensions projecting axially beyond the first cylinder at each end thereof and two end plates are adhered to these extensions and to the end of the first cylinder. These end plates each comprise two portions of different diameters that are co-axially superimposed and made from glass cloth impregnated with a thermosetting resin and moulded under high pressure.

In order to enable an electrical machine to operate in a cryogenic medium, it is known to create a thermal barrier, by surrounding a tank, which encloses the cryogenic medium, with an enclosure, in which a high vacuum prevails. Various different embodiments of such an enclosure are known per se, but for the use of vacuum of a the order of $10^{-5}$ mm. mercury, it is generally necessary to make use of a continuous pumping.

The difficulty of maintaining the vacuum arises particularly when liquid hydrogen is used as the cryogenic medium, by reason of its very high diffusion constant. Now, it is actually liquid hydrogen which is the most interesting to use for the operation of electrical machinery in a cryogenic medium, by reason of the super-conductivity of pure aluminium at —250° C., i.e. at the temperature at which hydrogen liquifies.

For tanks which have to enclose this cryogenic medium, the constructional material must necessarily have a base of glass impregnated by a synthetic material, with the exclusion of all metal. In order to produce tanks of this type, a laminated material made of glass cloth impregnated by a suitable synthetic resin, preferably epoxy or polyester resin, is advantageously used. With such a material, the sealed assembly of the constituent parts, for example the cylinders and flanges, is possible by using the arrangement, described in my copending patent application Ser. No. 496,263 filed Oct. 15, 1965, for "Sealed Tank Joints."

However, for tanks of a certain size, intended for high power electrical machinery, if the flat laminated material forming a flange which is obtained by casting under high pressure, is compact and sealed, the laminated material of the cylindrical portion, obtained by the technique of rolling at average pressure, presents a certain porosity and necessitates the installation of a continuous pumping system in the vacuum enclosure which surrounds the tank containing the cryogenic medium.

Therefore atttempts have been made to produce the cylindrical portion of the tanks by means of a compact and sealed substance, withstanding any diffusion of gas through its thickness, by using for example glass or a certain number of polymeric products such as: polycarbonates, polypropylenes and polyethylenes. But, when these materials are used, very great difficulties are met with for assembling in a sealed fashion the various constituent portions of the enclosures to be manufactured. In addition, the mechanical properties of these materials change at very low temperatures and they become very fragile, this constituting an extra drawback in their use.

The present invention has for an object high vacuum sealed tanks for electrical machinery operating in a cryogenic medium. In brief, according to one characteristic of the invention, this result may be obtained by producing the tanks by means of a composite assembly made from a compact and sealed material, and a laminated material moulded therewith.

In order that the invention may be more clearly understood, reference will now be made to the accompanying drawing showing one embodiment thereof by way of example.

Referring to the drawing, this shows a section through a portion of a tank according to the present invention. The double cylindrical wall of this tank is composed of a first compact wall 1 made of glass or thermoplastics material, and of a second wall 2 made of a laminated material having a base of glass cloth impregnated by an epoxy resin. These two walls 1 and 2 are adhered together by means of the actual resin used for impregnating the cylindrical wall 2. The wall 1 renders the tank impermeable, whilst the wall 2, which constitutes the structural element, permits assembly by adhered and protected sealed joints. End plates 3, made of a laminated material of the same nature but more dense, obtained by moulding under high pressure and machining, are adhered to the double cylindrical wall 1 and 2 at each of its ends. In order to simplify the drawing, only one of these ends has been shown, the other being symmetrical.

In view of the fact that these end plates 3 are made of a compact one-piece laminated material, moulded under pressure, it is not necessary to line them with a layer of glass or thermoplastics material in order to produce a perfectly sealed enclosure.

Such a cylinder of composite structure, may be manufactured in the following manner.

A mandrel is firstly made with the compact and sealed material constituting the cylindrical wall 1. For this, a number of methods known per se are possible. For example a tube constituted by the compact material: glass or thermoplastics resin, for example 4 mm. in thickness, may be fitted on a steel cylinder, coated with a demoulding agent i.e., an inhibitor. If a thermoplastics resin is chosen, it may be taken in sheet form and be wound around the steel mandrel and welded by heating the edges of the tube thus produced. The steel mandrel may also be coated with a gelled thermoplastics resin powder (plastigel) which is transformed into a compact substance by thermal treatment and whose shape is corrected by machining and polishing. A particularly suitable material is a polyethylene of high molecular weight, which conserves its resilience up to the temperature of liquid hydrogen, such as the product known in commerce and produced by the Hercules Powder Co. under the name: Hifax 1900, because it has a good resistance to mechanical stresses at low temperatures.

A glass cloth impregnated by thermosetting resin, such as a polyepoxy resin, is wound, by a method known per se, by the technique of rolling between pressure rollers, on the above mentioned compact material forming a mandrel and from which the polish has been previously taken off. This external sheath 2 extends to the two ends of the cylinder beyond the subjacent portion 1, along two extensions 4.

When the desired thickness, for example 6 mm., has been obtained, the whole of the cylinder 1 and 2 is subjected to a polymerisation, at a hot or ambient temperature, according to the dimensions of the cylinder and the hardening mixture chosen for the thermosetting resin.

The latter operation consists in withdrawing the metal mandrel, this operation being facilitated if the mandrel has been previously coated with a demoulding agent or inhibitor as referred to above. Appropriate inhibitors for this purpose are well known.

The end plates 3 in the form of two portions of different diameters that are co-axially superimposed are adhered to the base of the wall 1 and on the extensions 4. These extensions 4 enable a good sealed joint to be obtained between the end plates 3 and the cylindrical portion. This seal may be further improved by applying collars 5 as described in my aforementioned copending application.

Experiments have been carried out to test the sealing of a tank made in the manner described, the dimensions of which were: external height 600 mm., internal diameter 100 mm.; thickness of the lateral walls 10 mm., constituted by the superposition of 4 mm. compact material 1, and 6 mm. laminated material 2 made of glass cloth impregnated by epoxy resin; thickness of the end plates 3:24 mm. The initial vacuum of $5 \times 10^{-6}$ mm. of mercury was maintained with a leakage lower than $10^{-9}$ millimetres sec. referred to normal conditions of pressure and temperature.

Tanks of larger dimensions produced according to the invention, also withstood a high vacuum, without continuous pumping, with at the most all the pumping operations spaced out with respect to cycles of thermal variations, this rendering them suitable to be used for constructing cryotransformers.

I claim:

1. A cylindrical evacuated sealed tank for electrical machinery operating in a cryogenic medium, comprising a first cylinder made of compact and sealed material selected from glass and thermoplastics materials, a second cylinder applied to said first cylinder by winding therearound a glass cloth impregnated with a thermosetting resin, extensions of said second cylinder projecting axially beyond said first cylinder, at each end of said latter, and two end plates each in the form of two portions of different diameters that are co-axially superimposed and made from glass cloth impregnated with a thermosetting resin, and moulded under high pressure, adhered to said extensions of said second cylinder and to the end of said first cylinder.

2. A tank according to claim 1, wherein a collar is applied co-axially around the joint between each of said end plates and said second cylinder.

References Cited

UNITED STATES PATENTS

| | | | |
|---|---|---|---|
| 2,350,271 | 5/1944 | Braloff | 229—4.5 |
| 2,639,833 | 8/1953 | Schwarz | 220—67 |
| 2,744,043 | 5/1956 | Ramberg | 220—3 |
| 2,848,133 | 8/1958 | Ramberg | 220—3 |
| 2,991,808 | 7/1961 | Siegmann et al. | 200—3 |
| 3,002,534 | 10/1961 | Noland | 220—3 |
| 3,106,313 | 10/1963 | Kurhan | 220—9 |
| 3,073,475 | 1/1963 | Fingerhut | 220—3 |
| 3,215,576 | 11/1965 | Huff | 220—3 |
| 3,296,802 | 1/1967 | Williams | 229—4.5 |

THERON E. CONDON, *Primary Examiner.*

JAMES R. GARRETT, *Examiner.*